United States Patent [19]
Miyamoto et al.

[11] Patent Number: 5,697,255
[45] Date of Patent: Dec. 16, 1997

[54] VERTICAL NON-PARALLEL LINK TYPE ROBOT

[75] Inventors: Hideto Miyamoto, Uozu; Keisho Homma, Takaoka, both of Japan

[73] Assignee: Kabushiki Kaisha Fujikoshi, Toyama, Japan

[21] Appl. No.: 309,633

[22] Filed: Sep. 21, 1994

[30] Foreign Application Priority Data

Sep. 21, 1993 [JP] Japan ................... 5-055509 U

[51] Int. Cl.$^6$ ................................. B25J 9/06
[52] U.S. Cl. .................. 74/490.01; 74/490.03; 901/49; 414/719
[58] Field of Search ............... 74/479.01, 480 R, 74/490.01, 490.03; 901/22, 23, 24, 15, 49; 414/719, 729

[56] References Cited

U.S. PATENT DOCUMENTS

| | | | |
|---|---|---|---|
| 4,842,474 | 6/1989 | Torii et al. | 414/680 |
| 4,986,724 | 1/1991 | Steinmetz et al. | 901/23 X |
| 5,201,239 | 4/1993 | Bundo et al. | 901/23 X |
| 5,303,788 | 4/1994 | Muselli et al. | 74/479.01 X |
| 5,357,824 | 10/1994 | Hashimoto | 74/490.03 X |

Primary Examiner—Charles A. Marmor
Assistant Examiner—David M. Fenstermacher
Attorney, Agent, or Firm—Spencer & Frank

[57] ABSTRACT

A vertical non-parallel link type robot having a robot arm construction with which it is possible to increase a movement range easily and cheaply without making the moving arm longer, and to make the driving motor for an upper arm lighter. The robot has a base, a revolving table mounted on the base and rotatable with respect to the base about a vertical axis thereof, a vertical lower arm mounted on the revolving table and pivotable with respect to a first horizontal axis thereof, and a mounting structure whose upper portion is pivotably supported on one side of the tip or upper end of the lower arm with respect to a second horizontal axis thereof and whose lower portion depends from and extends at a right angle to the upper portion. A normally horizontal upper arm having a wrist at its front end is mounted on and extends in a forward direction from the lower portion of the pivotable mounting structure with the upper arm being supported on the mounting structure so that its longitudinal axis is spaced from the second horizontal axis in a direction toward the first horizontal axis. A wrist drive motor is mounted on the side of the lower portion of the mounting structure opposite that on which the upper arm is mounted.

2 Claims, 3 Drawing Sheets

5,697,255

VERTICAL NON-PARALLEL LINK TYPE ROBOT

BACKGROUND OF THE INVENTION

This invention relates to an arm construction of a non-parallel link type articulated industrial robot, used for spot welding or handling mass-produced articles or the like, having drive motors mounted on an upper arm for driving shafts of the wrist of the upper arm, and in particular to an arm construction of an industrial robot of which a wide movement range and small installation space are required which enables the movement range of the robot to be enlarged and the robot height lowered without the moving arms being lengthened.

Conventional non-parallel link type articulated industrial robots having drive motors for driving the shafts of the wrist of the upper arm mounted on the upper arm itself include for example that shown in U.S. Pat. No. 4,842,474. With this kind of non-parallel articulated industrial robot it has been possible to partially supplement the movement range in the vertical direction by using a supplementary raising bed/pit, but often the task for which a robot is to be used has required a substantial movement range in the robot's front-rear direction. However, because it is not easy to increase the front-rear direction movement range, where necessary robots have been mounted on travel apparatuses movable in the front-rear direction, and because such travel apparatuses themselves are expensive it has been impossible to avoid increases in the cost of the overall system. Methods of enlarging the movement range of such non-parallel link type articulated industrial robots that have been adopted in the past in order to get around this problem include making the moving arms long and increasing the angles of movement of the moving arms.

However, in a conventional non-parallel link type articulated robot of this kind, such as that shown in FIG. 3 (Prior Art), when the lower arms 29, 22 are lengthened in order to increase the movement range in the robot's front-rear direction and the upper arm 21 is lengthened in order to increase the movement range in the vertical direction, this brings about increases in unbalance torques and inertia and consequently larger motors and transmissions become necessary. Also, it becomes necessary to raise the rigidity of the arms, leading to the arms becoming thick and heavy. For these reasons, in the end it has been impossible to avoid increases in the size and cost of the robot itself. Furthermore, in the case of robots required to be space-saving, increases in robot size have lead to increases in layout size and put limitations on where the robots can be used. As can be understood from FIG. 3 (Prior Art), which shows the movement range of a conventional non-parallel link type articulated robot of which the upper arm 21 has been lengthened in order to increase the movement range in the vertical direction, just extending the moving arm causes a movement range L to be formed away from the robot and inevitably enlarges the installation space taken up by the robot. When the lower arms 22, 29 are made longer, on the other hand, the height of the robot increases and the restriction arises that the robot cannot be installed in places with low ceilings, where conveyors tend to be located.

With the method of increasing the movement angles of the moving arms, when the movement angles of the moving arms are increased the bending undergone by the cables running between the lower arms and the upper arm becomes severe and cable life is markedly reduced. Also, there have been problems such as that increases in the movement angles result in decreases in the resolution of position detectors.

SUMMARY OF THE INVENTION

An object of this invention is, in a vertical non-parallel link type articulated industrial robot having drive motors for driving the shafts of the wrist of the upper arm mounted on the upper arm itself, to provide a robot arm construction with which it is possible to increase the movement range easily and cheaply and without lengthening the moving arms.

Another object of the invention is, in the non-parallel link type articulated industrial robot mentioned above, to provide a robot arm construction with which it is possible for the height of the robot to be lowered without shortening the moving arms.

Another object of the invention is, in the non-parallel link type articulated industrial robot mentioned above, to provide a robot arm construction with which it is possible to reduce the size of the lower arm drive motor.

A further object of the invention is, in the non-parallel link type articulated industrial robot mentioned above, to provide an upper arm construction with which it is possible to improve the gravitational balance and reduce the counterweight of the upper arm.

These and other objects of the invention have been achieved, by a vertical non-parallel link type robot comprising: a base; a revolving table mounted on the base and rotatable with respect to the base about a vertical axis thereof; a vertical lower arm mounted on the revolving table to be pivotable with respect to a first horizontal axis in a forward and a rearward direction, with the first horizontal axis being perpendicular to and laterally spaced from the vertical axis; a mounting structure having an upper portion which is pivotably supported on one side of the upper end of the lower arm with respect to a second horizontal axis which is parallel with and spaced from the first horizontal axis, the mounting structure having a lower portion which depends from and extends at a right angle to the upper portion; a normally horizontal upper arm mounted on and extending in a forward direction from the lower portion of the mounting structure for pivotal movement therewith in an up and down direction, with the upper arm being supported on the mounting structure such that the longitudinal axis of the upper arm, when the upper arm is in the normal horizontal position, is spaced from the second horizontal axis in a direction toward the first horizontal axis; a wrist provided at a front end of the horizontal upper arm; and, a wrist drive motor mounted on a side of the lower portion of the mounting structure opposite the side on which the upper arm is mounted.

By means of this construction, with the robot arm construction of this invention, because the axis of the upper arm is offset downward of the horizontal pivot shaft, it is possible to enlarge the front-rear direction movement range of the robot without extending the moving arms of the robot, that is, without having to enlarge the layout, and also it is possible to reduce the robot height without shortening the moving arms of the robot and without reducing the movement range of the robot. Also, because the drive motors for driving the shafts of the wrist are mounted offset downward of the horizontal pivot shaft, the center of gravity of the lower arm is lowered and it is possible to reduce the size of the drive motor of the lower arm. Preferably, the motor for driving the upper arm is disposed substantially coaxially with the horizontal pivot shaft so that the upper arm drive motor and the upper arm are disposed in series, enabling the number of parts and the cost to be reduced, and preferably the drive motors for driving the shafts of the wrist are disposed projecting backward from the opposite side of the lower portion of the mounting structure, so that the gravitational balance of the upper arm is improved and the upper arm counterbalancing weight can be reduced.

DETAILED DESCRIPTION OF THE PREFERRED EMBODIMENTS

A preferred embodiment of the invention will now be described with reference to the accompanying drawings.

Figure 1A:
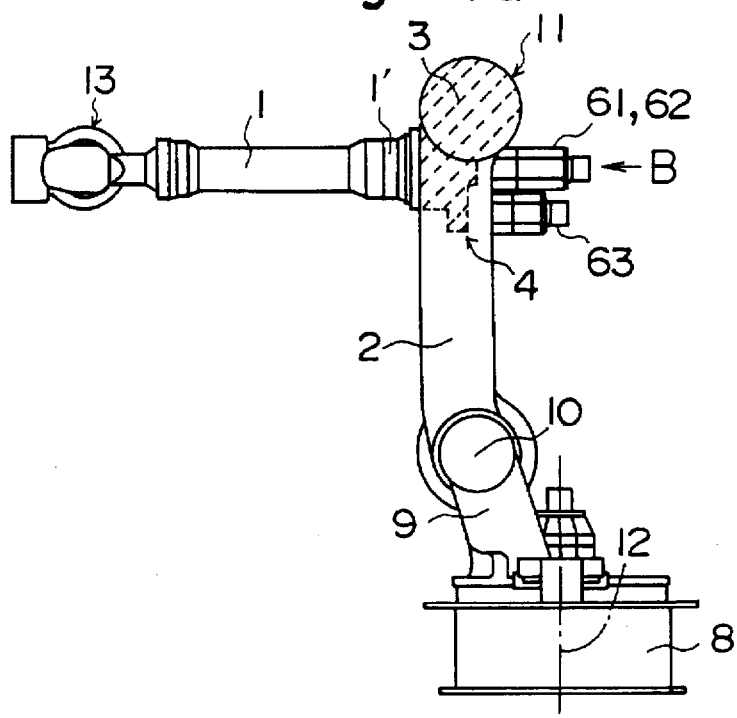
FIG. 1a is an outline right side view showing the construction of an embodiment of a vertical non-parallel link type articulated industrial robot having a downward effect upper arm axis according to the invention.

FIG. 1a shows the construction of a vertical non-parallel link type articulated industrial robot having a downward effect upper arm axis according to a preferred embodiment of the invention of which drive motors 61, 62 and 63 for driving a wrist 13 disposed at a front end of a horizontal upper arm 1 are mounted on the upper arm 1 itself. In the robot of this invention a revolving table 9 is mounted revolvably about a vertical axis 12 on a base 8, a horizontal pivot shaft 10 is disposed on the upper end portion of the revolving table 9, and a vertical lower arm 2 is mounted on the horizontal pivot shaft 10 pivotally thereabout in the forward (in FIG. 2a, at an angle θ5) and rearward (in FIG. 2a, at an angle θ1) directions. The horizontal upper arm 1 is pivotably supported with respect to and spaced from a horizontal pivot shaft 3 disposed on the upper end portion 11 of the lower arm 2 so that it can pivot up and down about the horizontal pivot shaft 3.

Figure 1B:
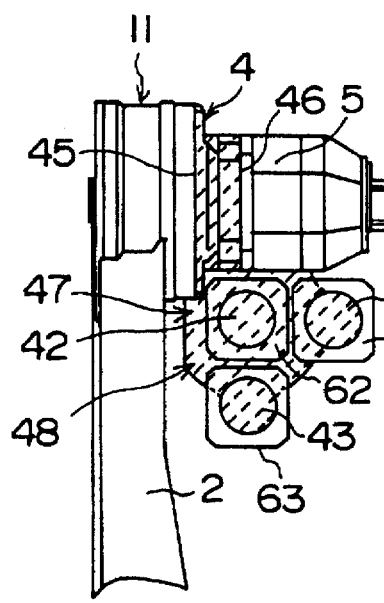
FIG. 1b is an enlarged partial rear view of the upper part of FIG. 1a as seen from the rear in the direction B.
Figure 1C:
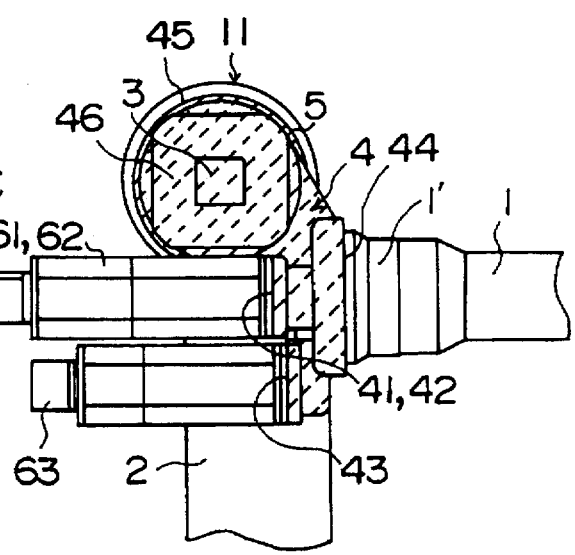
FIG. 1c is an enlarged partial right side view in the direction C of FIG. 1b. For convenience of description, cross-sectional contours of the L-shaped mounting structure 4 of the embodiment are shown with broken-line hatching.
Figure 2A:
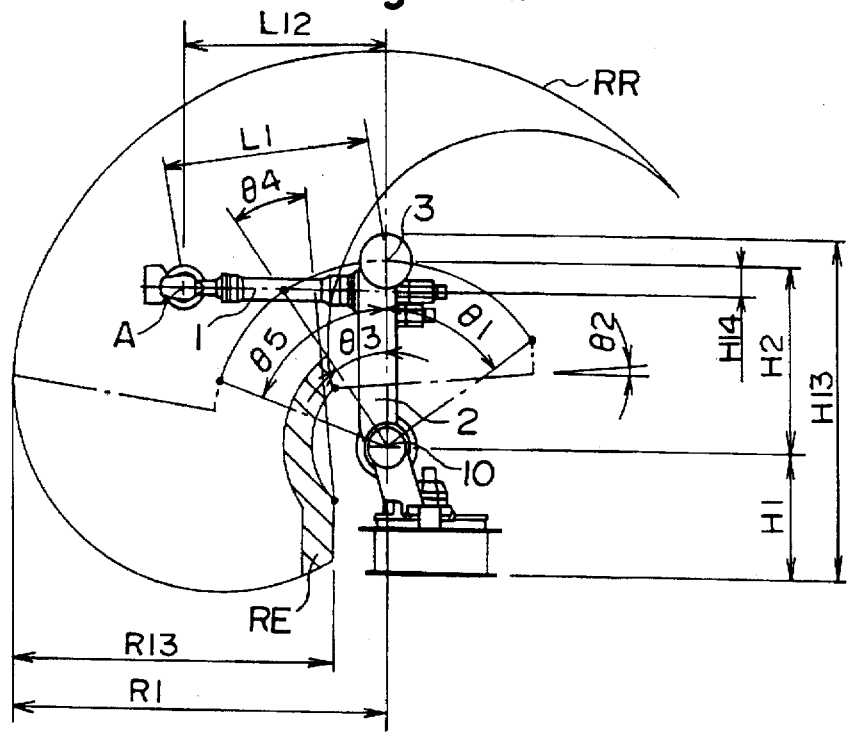
FIG. 2a is an outline right side view showing the movement range RR described by the centerpoint A of the wrist of a non-parallel link type articulated industrial robot of the invention, and FIG. 2b (Prior Art) is an outline right side view showing the movement range R described by the centerpoint A of the wrist of a conventional non-parallel link articulated robot; in order to make the loads on the drive systems equivalent, the length of the upper arm, i.e. the distance L1 between the center of the horizontal pivot shaft 3 and the center point A of the wrist 13, the height H1 of the base 8 and the revolving bed 9 the height H2 of the lower arm 2, and the movement angles θ1 to θ5 of the robots have been made the same.

In this invention, as can be clearly understood from FIG. 1b showing an enlarged partial rear view of the upper part of FIG. 1a as seen from the rear in the direction B and FIG. 1c showing an enlarged partial right side view in the direction C of FIG. 1b, the horizontal pivot shaft 3 of the upper arm 1 is disposed on the upper end portion 11 of the lower arm 2. An upper portion 45 of the mounting structure 4 is pivotably supported on one side of a tip or an upper end portion 11 of the lower arm 2, and the lower portion 47 of the mounting structure 4 depends from and extends at a right angle to the upper portion 45. The upper arm 1 extends in a front or forward direction from a lower portion 47 of the mounting structure 4 and pivotably supported with respect to and spaced from the horizontal pivot shaft 3 toward the horizontal pivot shaft 10. The drive motors 61, 62 and 63 for driving shafts (now shown) of the wrist 13 are mounted on the opposite side 48 at 41, 42 and 43 of the lower portion 47 of the mounting structure 4, thereby the axis 1A (FIG. 2a) of the upper arm 1 is downward offset from the center 3A of the horizontal pivot shaft 3 by the height H14 (FIG. 2a). In FIG. 1a, FIG. 1b and FIG. 1c, for convenience of description, the cross-sectional contours of the mounting structure 4 of this preferred embodiment are shown with broken-line hatching. In this preferred embodiment, an upper arm drive motor 5 is disposed substantially coaxially with the horizontal pivot shaft 3 and the drive motors 61, 62 and 63 for driving the shafts of the wrist 13 are disposed projecting backward from the opposite side 48 at 41, 42 and 43 of the lower portion 47 of the mounting structure 4. The mounting structure 4, the upper arm drive motor 5, the upper arm base portion 1' and the drive motors 61, 62 and 63 of the shafts of the wrist 13 are joined together by ordinary fixing means such as bolts or the like.

Figure 2B:
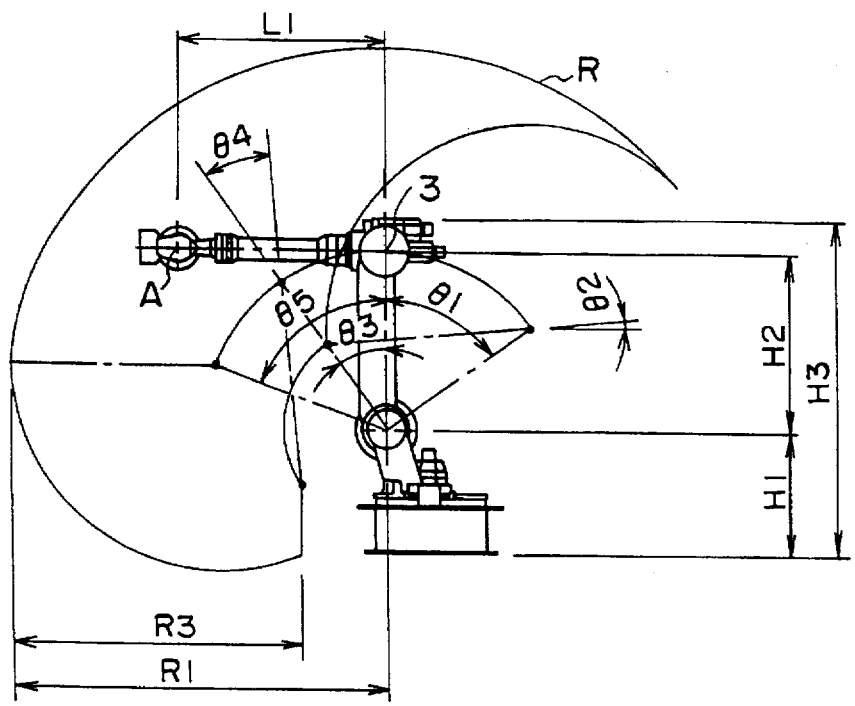
Figure 3:
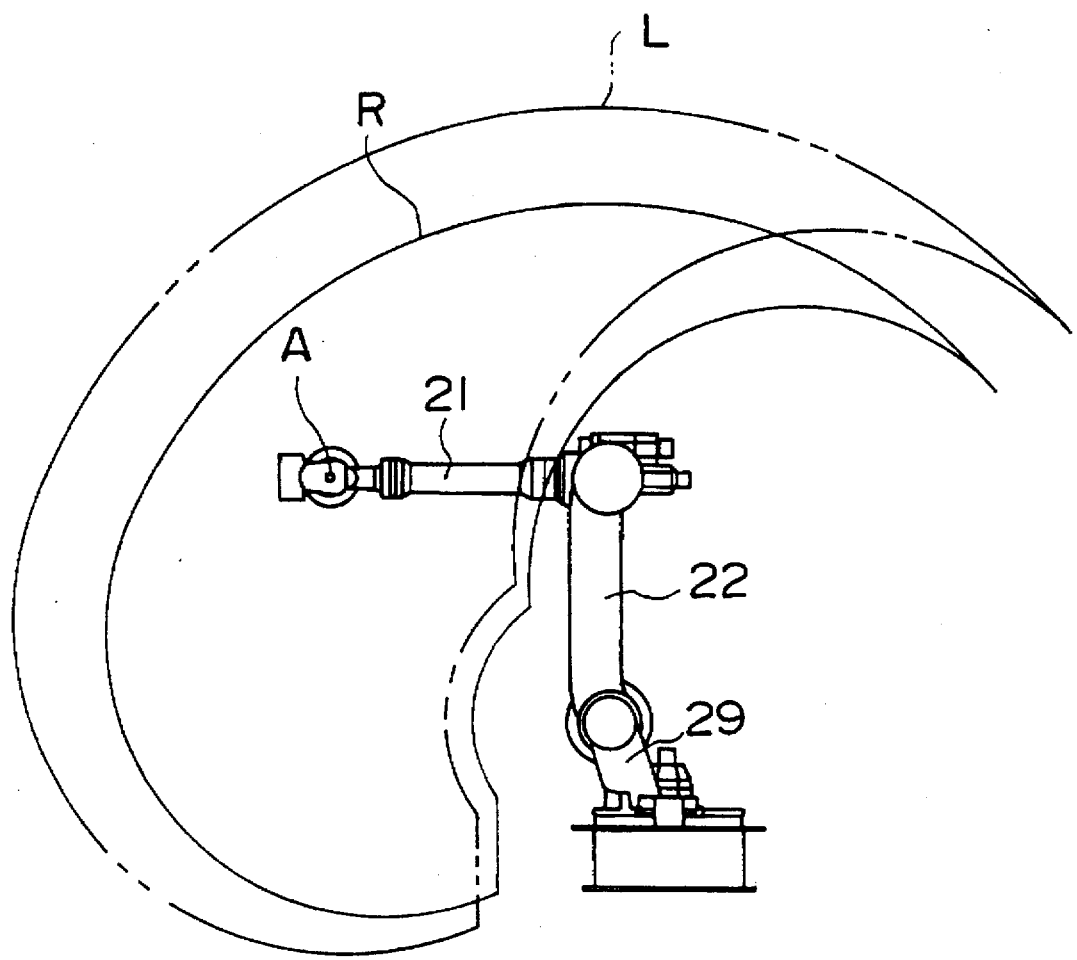
FIG. 3 (Prior Art) is an outline right side view showing the movement range R described by the centerpoint A of the wrist of the conventional non-parallel link type articulated robot shown in FIG. 2b (Prior Art) and the movement range L described by the centerpoint A of the wrist of the same robot when its upper arm 21 has been lengthened.

The movement range RR shown in FIG. 2a described by the centerpoint A of the wrist of the non-parallel type articulated industrial robot of the invention of FIG. 1a will now be compared with the movement range R described by the centerpoint A of the wrist of the conventional non-parallel link type articulated industrial robot shown in FIG. 2b (Prior Art). In order to make the loads on the drive systems equivalent, the length of the upper arm 1, i.e. the distance L1 between the center of the horizontal pivot shaft 3 and the centerpoint A of the wrist 13, the height H1 of the bases 8 and the revolving beds 9, 29, and the movement angles θ1 to θ5 of the robots have been made the same. The length L1 of the upper arm 1 of FIG. 2a is the diagonal distance between the center of the horizontal pivot shaft 3 and the centerpoint A of the wrist 13, and the dimensions L12 and H14 have been chosen so that $(L1)^2 = (L12)^2 + (H14)^2$.

As a result, when FIG. 2a and FIG. 2b are superimposed, the distances R1 between the forward movement range reached when the robot is most forwardly inclined and the horizontal pivot shaft 10 are no different but the front-rear direction movement range RR of the robot of FIG. 2a is larger by the movement range RE, shown with hatching, because R13 is greater than R3. Also, the height H13 of the robot of FIG. 2a is lower than the height H3 of the robot of FIG. 2b.

That is,

R1=R1, but

R13>R3 and

H13<H3.

What is claimed:

1. A vertical non-parallel link type robot comprising:

a base;

a revolving table mounted on the base and rotatable with respect to the base about a vertical axis thereof;

a vertical lower arm mounted on the revolving table to be pivotable about a first horizontal axis, with the first horizontal axis being perpendicular to and laterally spaced from the vertical axis;

a mounting structure having an upper portion which is pivotably supported on one lateral side of the upper end of the lower arm about a second horizontal axis which is parallel with and spaced from the first horizontal axis, the mounting structure having a lower portion which extends both downwardly from and at a right angle to the upper portion;

an upper arm mounted on and extending from the lower portion of the mounting structure for pivotal movement therewith, with the upper arm being supported on the mounting structure such that the longitudinal axis of the upper arm, when the upper arm is in a horizontal position, is spaced from the second horizontal axis in a direction toward the first horizontal axis;

a wrist provided at a front end of the horizontal upper arm; and, a wrist drive motor mounted on a side of the lower portion of the mounting structure opposite the side on which the upper arm is mounted.

2. A vertical non-parallel link type robot according to claim 1, further comprising a drive motor for driving the upper arm disposed substantially coaxially with said second horizontal axis, and the drive motor for driving the wrist projects from the opposite side of said lower portion of the mounting structure.

* * * * *